United States Patent [19]

Trittipoe

[11] 4,215,880
[45] Aug. 5, 1980

[54] TUBE CLAMP

[75] Inventor: Jack H. Trittipoe, Elwood, Ill.

[73] Assignee: Caterpillar Tractor Co., Peoria, Ill.

[21] Appl. No.: 958,456

[22] Filed: Nov. 6, 1978

[51] Int. Cl.$^2$ .............................................. F16L 3/10
[52] U.S. Cl. ..................................... 285/61; 285/368; 285/382.4; 285/414
[58] Field of Search ................. 285/61, 368, 412, 414, 285/415, 413, 382.4, 382.5; 248/49, 58, 62

[56] References Cited

U.S. PATENT DOCUMENTS

| | | | |
|---|---|---|---|
| 2,681,817 | 6/1954 | Demlow | 285/368 X |
| 3,850,455 | 11/1974 | Stafford | 285/368 X |
| 3,999,784 | 12/1976 | Kennedy | 285/62 |

FOREIGN PATENT DOCUMENTS

| | | | |
|---|---|---|---|
| 122934 | 8/1901 | Fed. Rep. of Germany | 285/413 |
| 1188921 | 3/1959 | France | 285/368 |
| 1445449 | 5/1966 | France | 285/368 |
| 262242 | 8/1929 | Italy | 285/368 |

*Primary Examiner*—Dave W. Arola

*Attorney, Agent, or Firm*—Wegner, Stellman, McCord, Wiles & Wood

[57] ABSTRACT

A fitting (11) for connecting a tube (17) in fluid flow communication with a hose end (13) having a distal collar (12) provided with a plurality of through holes (19 and 20) extending parallel to the hose end axis. The fitting includes an annular flange (15) having a central bore (21) for receiving the distal end of the tube. The flange includes a threaded hole (26) aligned with a first (19) of the collar holes, and a second, through hole (20) aligned with a second of the collar holes. The fitting further includes an annular clamp (16) for supporting the tube end axially outwardly of the flange and including a pair of clamp halves (32 and 33) with one of the halves (32) being secured to the flange by a bolt (40) extending through the collar and flange. The other of the clamp halves (33) is secured to the first clamp half by bolts (36) extending through at least one of the clamp halves. The tube end may be sealingly secured to the flange and the flange may be sealingly secured to the collar in the made-up arrangement of the fitting.

12 Claims, 5 Drawing Figures

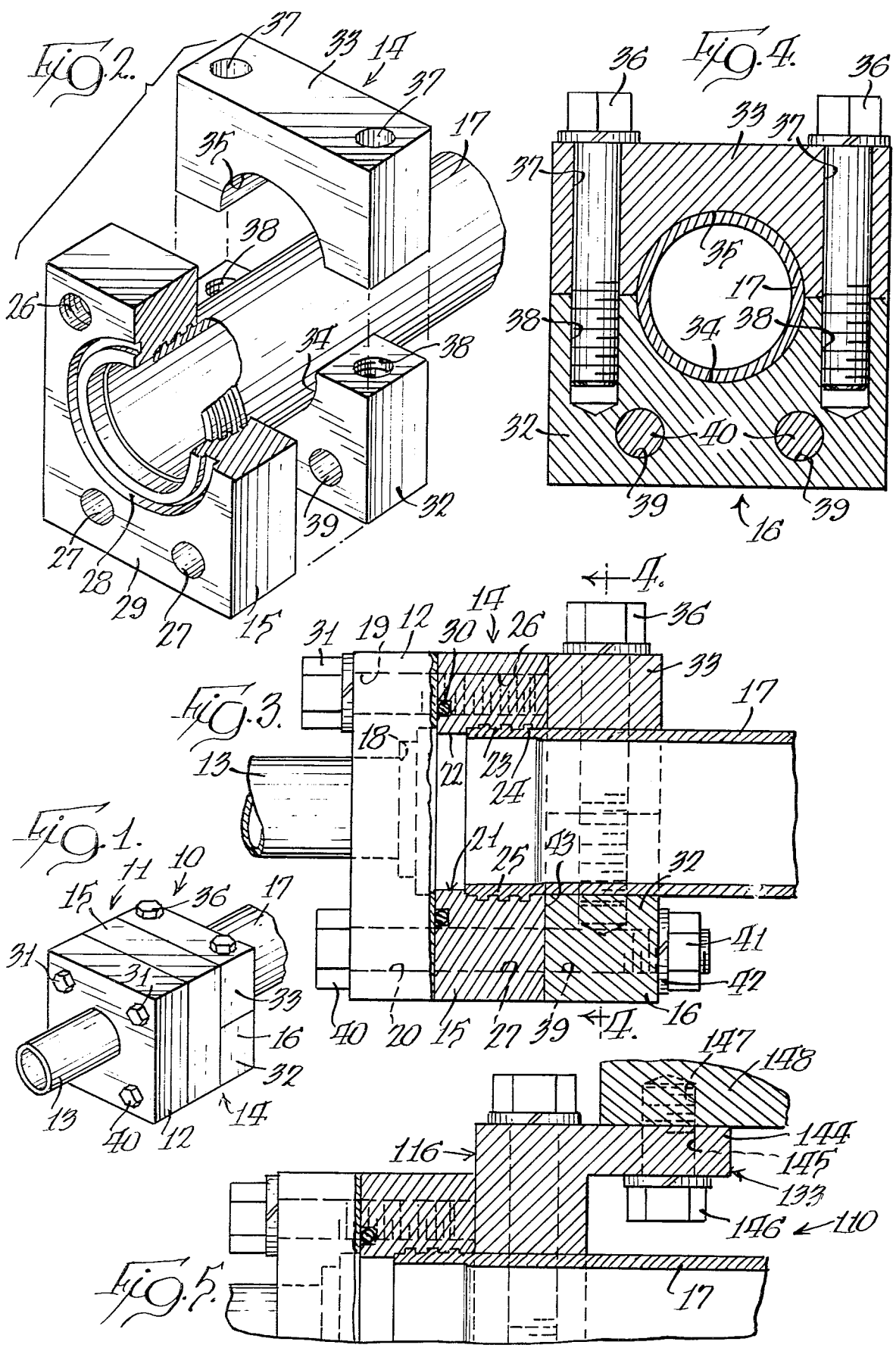

४,२१५,८८०

TUBE CLAMP

BACKGROUND OF THE INVENTION

1. Field of the Invention

This invention relates to tube fittings, and in particular to fittings wherein the tube end is expanded into sealingly secured relationship to a flange portion of the fitting.

2. Description of the Prior Art

In one conventional form of tube fitting, the distal tube end portion is swaged into annular grooves in a flange part of the fitting so as to have a sealed connection thereto. The radial enlargement of the tube end, in being sealingly secured to the flange, causes stresses to be developed in the tube end particularly at the point where the tube enters the flange.

A hose end may be provided with a collar adapted to be sealingly connected to the flange in coaxial extension to the tube end. It has been found that flexing of the hose tends to introduce a stress in the tube end, particularly where the tube end is rigidly mounted, which stresses may tend to fatigue the metal of the tube.

SUMMARY OF THE INVENTION

The present invention comprehends an improved tube connection assembly wherein a fitting is provided having a connector including an annular clamp secured outwardly of the flange for supporting the tube end and thereby absorbing stresses developed in the portion of the tube extending outwardly from the flange so as to provide an extended life of the assembly.

In the illustrated embodiment, the clamp support has an axial extent substantially greater than the axial extent of the radially deformed distal end portion of the tube.

The clamp can have a clamping bore having a diameter no greater than the outer diameter of the tube end to provide improved positive support of the tube end in the assembly.

In the illustrated embodiment, threaded securing means can be provided for securing together each of the hose and collar, flange, and clamp.

The clamp can include separable portions secured together by threaded securing means.

In the illustrated embodiment, one of the clamp portions is secured to the other clamp portion which, in turn, is secured to the flange and collar by a threaded securing means.

The collar can be further secured to the flange by threaded securing means cooperating solely between the collar and flange.

In the illustrated embodiment, one of the clamp portions is secured solely to the other clamp portion, with the other clamp portion being secured to the flange.

In one form, one of the clamp portions is provided with a turned flange for use with cooperating threaded securing means in mounting the fitting to a support.

The improved assembly provides a novel distribution of stress forces in the tube end so as to substantially increase fatigue life of the assembly in a novel and simple manner.

BRIEF DESCRIPTION OF THE DRAWING

Other features and advantages of the invention will be apparent from the following description taken in connection with the accompanying drawing wherein:

FIG. 1 is a perspective view of a tube connector assembly embodying the invention;

FIG. 2 is a broken exploded perspective view illustrating the attachment of the two ends to the connector portion of the assembly;

FIG. 3 is a diametric section of the assembly;

FIG. 4 is a transverse section taken substantially along the line 4—4 of FIG. 3; and FIG. 5 is a fragmentary diametric section illustrating a modified form of the connector assembly including means for securing the assembly to an adjacent support.

DESCRIPTION OF THE PREFERRED EMBODIMENT

In the exemplary embodiment of the invention as disclosed in the drawing, a tube connection assembly generally designated 10 includes a fitting 11 having a collar 12 secured to the end of a hose 13 and a connector 14 having a flange 15 and a clamp support 16 on a tube end 17.

As best seen in FIG. 3, the hose end 13 is sealingly secured to the collar 12 in a stepped bore 18 thereof. The collar is provided with a pair of first through holes 19 and a pair of second through holes 20.

As best seen in FIGS. 2 and 3, flange 15 of connector 14 defines a central through bore 21 having an inner, right cylindrical portion 22 and an outer radially enlarged right cylindrical portion 23 provided with a plurality of radially inwardly opening annular grooves 24. As shown in FIG. 3, the diameter of the outer portion 23 is substantially equal to the outer diameter of the tube end 17.

The distal end 25 of the tube end 17 is radially enlarged into sealed secured engagement with the flange in the outer bore portion 23. Thus, as shown in FIG. 3, the tube distal end 25 is forcibly urged into the annular grooves 24 to securely mechanically lock the tube end to the flange while at the same time providing a positive seal therebetween. Illustratively, the radial enlargement of the tube end may be effected by conventional swaging operation.

The flange includes a pair of threaded holes 26 aligned one each with the holes 19 of collar 12 and a pair of through holes 27 aligned one each with the holes 20 of collar 12. As further shown in FIG. 2, the flange may be provided with an annular groove 28 opening axially inwardly from the inner surface 29 of the flange and provided with a suitable O-ring 30 (FIG. 3), which is compressed sealingly between the flange and the collar in the made-up arrangement of the fitting as shown in FIG. 3.

A first pair of threaded securing elements, herein bolts, 31 is extended through holes 19 and threaded into threaded holes 26 of the flange to serve as a first securing means for securing the flange to the collar.

As best seen in FIG. 4, clamp support 16 includes a first clamp portion 32 and a second clamp portion 33 which, in the illustrated embodiment, define clamp halves. Clamp portion 32 defines a semicylindrical clamping bore 34 and second portion 33 defines a semicylindrical complementary clamping bore 35 for receiving the tube end 17 clampedly therebetween when the clamp portions 32 and 33 are secured in clamping association as shown in FIG. 4.

More specifically, the clamping halves are secured in clamped association by means of threaded securing means 36 which, in the illustrated embodiment, comprise bolts extended through a first pair of holes 37 in one of the clamp portions, illustratively comprising clamp portion 33, and threaded into threaded holes 38 in the other of the clamp portions, illustratively comprising clamp half 32.

Clamp half 32 may be further provided with a pair of through holes 39 aligned with holes 27 of flange 15 and holes 20 of collar 12. Threaded securing means 40, comprising a pair of bolts, are extended through the aligned holes 20, 27, and 39 and secured by nuts 41 and lock washers 42 to clamp forcibly together the collar 20, flange 15, and clamp support 16.

Thus, in the illustrated embodiment, bolts 36 secure the two clamp halves together and bolts 40 secure the entire clamp support 16 to the flange 15 and hose collar 20. As shown in FIG. 3, the nuts 41 may be tightened so as to urge the clamp portion 32 forcibly against the outer surface 43 of the flange so as to dispose the clamp support accurately adjacent the flange and provide positive support of the tube end 17 immediately outwardly of the deformed portion 25, as seen in FIG. 3. It has been found that the improved clamping of the two halves 32 and 33 together by the bolts 36 independently of the securing of the clamp support to the flange 15 provides an improved support of the tube end effectively avoiding fatigue of the tube end metal notwithstanding substantial flexing and vibration of the hose 13.

In a modified form of the invention as shown in FIG. 5, the clamp support generally designated 116 is shown to be similar to clamp support 16 but having a clamp portion 133 provided with a turned outer flange 144 provided with a through hole 145 through which a threaded securing means, such as bolts, 146 may be extended and threaded into a suitable threaded hole 147 of an adjacent support 148 to firmly mount the assembly 110 to the support 148 and thereby provide further improved connection of the tube end 17 in the assembly. In all other respects, the assembly 110 is similar to assembly 10 and elements of assembly 110 which are similar to elements of assembly 10 are identified by similar reference numerals but 100 higher.

As seen in FIGS. 3 and 5, the axial extent of the clamp supports herein can be at least as great as the axial extent of the flange bore portion 23 in which the deformed distal portion 25 of the tube end is received so as to provide an improved, augmented support of the tube end effectively avoiding fatiguing of the tube end metal in the assembly in use.

It should be further noted, as seen in FIG. 3, that the securing means 40,41 clamping the support 16 to the flange 15 and collar 12 further provide a compressive force on the seal 30 so as to effect the desired sealing of the flange to the collar in the made-up arrangement of the assembly.

As will be obvious to those skilled in the art, the collar 12 can be secured to the flange by one or more bolts 31 and bolts 40, although, in the illustrated embodiment, a pair of such bolts is shown. Similarly, as will be obvious to those skilled in the art, the clamp halves can be secured together by one or more securing bolts 36, although, in the illustrated embodiment, a pair of such bolts is provided on opposite sides of the central bore 34,35. As further will be obvious to those skilled in the art, the clamp halves can be secured together by an extension of the bolts 36 fully through the lower clamp half 32 and the provision of suitable nut means (not shown). Similarly, the bolts 40 can be secured by threaded relationship with the clamp portion 32 by forming the holes 39 as threaded holes, thereby permitting the elimination of the nuts 41, if desired.

The foregoing disclosure of specific embodiments is illustrative of the broad inventive concepts comprehended by the invention.

The embodiments of the invention in which an exclusive property or privilege is claimed are defined as follows:

1. A fitting (11) for connecting a tube (17) in fluid flow communication with a hose end (13) having a distal collar (12) provided with a plurality of through holes (19 and 20) extending substantially parallel to the hose end axis, said fitting comprising:

an annular flange (15) having a central bore (21) having the distal end (25) of the tube positioned therein, said bore having at least one annular groove (24) having a radially expanded portion of said tube end positioned therein, said flange having a threaded hole (26) and a through hole;

an annular clamp (16) extending about said tube end and axially outwardly from said flange, said clamp including a first clamp half (32) having a first hole (39) and a pair of second holes (38) extending transversely to said first hole, and a second clamp half (33) having a pair of holes (37);

first threaded securing means (31) extending through one of said collar holes and threaded to said annular flange in said threaded hole and securing a first portion of said flange substantially coaxially to said collar;

second threaded securing means (40) extending through another of said collar holes, said flange through hole, and said first clamp half first hole securing said first clamp half and a second portion of said flange substantially coaxially to said collar and maintaining said annular clamp (16) in abutment with said flange; and a pair of third threaded securing means (36) extending each through a respective pair of holes of said clamp halves and securing the clamp halves in clamped relationship to said tube end and aligning a common surface of both clamp halves in a common plane for abutting said flange.

2. The fitting of claim 1 wherein said first clamp half (32) first hole (39) is a through hole and said second threaded securing means (40) extends fully through said collar, flange and first clamp half.

3. The fitting of claim 1 wherein the pair of holes (38) of one of said clamp halves (32) is threaded and said third threaded securing means (36) is threaded thereinto.

4. The fitting of claim 1 wherein one of said clamp halves (133) is provided with a turned mounting portion (144) and including fourth threaded securing means (146) for mounting the fitting to a support.

5. The fitting of claim 1 including an annular seal (30) positioned between said collar and flange.

6. The fitting of claim 1 wherein said clamp has an axial extent at least approximately that of said flange.

7. The fitting of claim 1 wherein said flange has at least one additional threaded hole and a corresponding number of additional collar through holes, and additional securing means are provided for extending through each said additional collar through hole and threading into said additional flange threaded holes.

8. The fitting of claim 1 wherein said collar, flange, and first clamp half each have at least one additional through hole and said second threaded securing means includes securing means for extending through respective additional holes of said collar, flange, and first clamp half.

9. A connector for attachment to a tube end, comprising:
- a flange (15) adapted to be sealingly connected to a distal portion (25) of the end;
- a support (16) having a first portion (32) and means removably securing said first portion in axial abutment with the flange, and a second portion (33); and
- means removably securing said second portion to only said support first portion (16) with the tube end positioned therebetween, said second support portion also abutting said flange as a result of being secured to said first support portion by said securing means for providing augmented support of the tube.

10. A tube connection assembly comprising:
- a tube end;
- a flange having radially inwardly opening annular grooves (24), said tube end including an outer distal portion radially outwardly deformed into sealing engagement in said grooves;
- support means for clampedly coaxially supporting the tube end axially inwardly of said radially deformed distal portion, said support means including a first portion (32) and means removably securing said first portion in axial abutment with the flange, and a second portion (33); and
- means removably securing said second portion to only said support first portion (16) with the tube end positioned therebetween, said second support portion also abutting said flange as a result of being secured to said first support portion by said securing means for providing augmented support of the tube.

11. The tube connection assembly of claim 10 wherein said support means has an axial extent substantially greater than the axial extent of said radially deformed distal tube end portion.

12. The tube connection assembly of claim 10 wherein said support means defines a through clamping bore (34,35) having a diameter no greater than the outer diameter of the tube end.

* * * * *